US008254843B2

(12) United States Patent
Tillotson

(10) Patent No.: US 8,254,843 B2
(45) Date of Patent: Aug. 28, 2012

(54) METHOD FOR POINTING HIGH-GAIN ANTENNAS TO REDUCE INTERFERENCE IN MOBILE NETWORKS

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 1147 days.

(21) Appl. No.: 11/609,076

(22) Filed: Dec. 11, 2006

(65) Prior Publication Data

US 2008/0139124 A1    Jun. 12, 2008

(51) Int. Cl.
*H04B 1/00*    (2006.01)
(52) U.S. Cl. .................... 455/63.4; 455/431; 455/562.1; 343/705
(58) Field of Classification Search ................. 455/63.4, 455/431, 562.1; 343/705
See application file for complete search history.

(56) References Cited

U.S. PATENT DOCUMENTS

| 2,473,175 | A | * | 6/1949 | Ridenour | 342/78 |
| 5,886,670 | A | * | 3/1999 | Manasson et al. | 343/772 |
| 5,926,135 | A | * | 7/1999 | Minkoff | 342/379 |
| 6,822,619 | B2 | * | 11/2004 | Shurvinton et al. | 343/853 |
| 6,947,733 | B2 | | 9/2005 | Tillotson | 455/423 |
| 7,072,634 | B2 | | 7/2006 | Tillotson | 455/296 |
| 7,379,515 | B2 | * | 5/2008 | Johnson et al. | 375/347 |
| 2002/0086708 | A1 | * | 7/2002 | Teo et al. | 455/561 |
| 2003/0095065 | A1 | * | 5/2003 | Ericson et al. | 342/354 |

* cited by examiner

*Primary Examiner* — Lana N Le
*Assistant Examiner* — Hsin-Chun Liao
(74) *Attorney, Agent, or Firm* — Yee & Associates, P.C.

(57) ABSTRACT

A method for reducing interference in a mobile network is provided. The method includes determining locations of a plurality of nodes in the mobile network; steering at least one antenna at a node in the plurality of nodes in the mobile network; estimating intensity of signals from the at least one antenna at each of the plurality of nodes; determining optimal direction to steer the at least one antenna to reduce interference; and steering the at least one antenna in the optimal direction.

16 Claims, 12 Drawing Sheets

| Spot | Gain | Relative | Coefficient |
|---|---|---|---|
| α | 0.518 | 1.0 | 1.0 |
| β | 0.387 | 0.747 | 1.339 |
| γ | 0.387 | 0.747 | 1.339 |
| δ | 0.268 | 0.517 | 1.934 |

METHOD FOR POINTING HIGH-GAIN ANTENNAS TO REDUCE INTERFERENCE IN MOBILE NETWORKS

BACKGROUND

1. Field of Disclosure

The disclosure generally relates to communication systems and, more particularly, to a method for reducing interference in mobile networks.

2. Related Art

For many communication applications, high gain antennas are used to improve performance. For example, high gain antennas are used to improve the performance of microwave links used for commercial telephony and satellite links. In most applications, the antenna beam points to a single communication node, such as a satellite or an aircraft. Different antenna beams may use the same frequency as long as the antenna beams do not overlap spatially.

However, situations may exist while a high-grain antenna at node A may be used to communicate with a communication node B, while one or more other communication nodes, C and perhaps D, are within the beam width of the high-gain antenna signals sent from communication node A to communication node B, in this case, the signals being sent from communication node A to communication node B may block communications being sent to, or between, the other communication nodes C and D.

Several approaches have been tried in an attempt to mitigate this problem. In a first approach, static off-axis pointing is used. For example, the high-gain antenna at communication node A is aimed so that communication node B with which it is communicating is slightly off the axis of the antenna beam, and a null in the antenna pattern is aimed at the communication node C. Although this approach minimizes interference to and from communication node C, the approach is performed using trial and error. Typically, the antenna is adjusted (often manually) until the signal to or from communication node B is optimized and interference to or from communication node C is minimized. This approach is too slow to respond to the dynamics of highly mobile transmitters and receivers.

In a second approach, the location and transmit power of a plurality of communication nodes is monitored by a control node. For example, the control node is in communication with all communication nodes A and includes the capability to calculate the total power reaching each adjacent communication node C from all communication nodes A. The control node commands some communication nodes A which it controls to reduce the power and data rate of their transmissions to keep interference from these communication nodes to a minimum. Unfortunately, this approach requires and consumes bandwidth that could otherwise be devoted to carrying data. Furthermore, this approach is not suitable for dynamic systems that often communicate at low elevation angles where multi-path interference causes rapid changes in signal intensity.

In a third approach, antennas are used which have large apertures. The larger aperture approach reduces the beam width of the communication node, which usually reduces interference to communication nodes that are not the intended targets of a transmission. However, this approach is not suitable for dynamic systems wherein communication nodes often move across the sky faster than a large antenna can steer. Furthermore, larger antennas cost more to purchase, install, and maintain, and are less suitable for use with a mobile node.

What is needed is a method that minimizes interference from a high-gain transmit antenna at one or more distant receiving nodes near the target node that is fast, non-expensive and which does not consume excessive bandwidth.

SUMMARY

In one aspect of the disclosure a method for reducing interference in a mobile network is provided. The method includes determining locations of a plurality of nodes in the mobile network; steering at least one antenna at a node in the plurality of nodes in the mobile network; estimating intensity of signals from the at least one antenna at each of the plurality of nodes; determining optimal direction to steer the at least one antenna to reduce interference; and steering the at least one antenna in the optimal direction.

In another aspect of the disclosure, a method for selecting a direction to point at least one antenna to reduce interference, comprising: loading a computer with an antenna pattern for a node; receiving identity of at least one primary node; continually receiving data about azimuth and elevation of each primary and secondary node; and computing antenna direction to minimize interference.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing features and other features of the disclosure are now described with reference to the drawings of embodiments. The illustrated embodiments are intended to illustrate, but not to limit the disclosure. The drawings include the following.

DETAILED DESCRIPTION

As used herein, the designations "node A" and "node B" refer to nodes in the process of establishing a link, for example, an antenna (node A) to an aircraft (node B). The designations "node C" and "node D" refer to two nodes other than nodes A and B in communication with a node designated "node E", and are capable of linking with node E, but not necessarily with node A or with node B. From the standpoint of node A and node B in a network, there may be zero, one, or a plurality of nodes C, nodes D, and nodes E. In addition, there may be zero, one, or a plurality of nodes E for any particular node C or node D, as any particular node C or node D may be in communication with zero, on e. or more other nodes.

A mobile network includes a plurality of nodes at which a high-grain antenna may be pointed, such as target nodes, and at least one stationary node. Target nodes include, but are not limited to aircraft, spacecraft, a satellite in geostationary orbit or a surface vehicle; and are referred to as nodes B, C and D. Stationary nodes, such as A and E, are typically high gain antennas.

A "link," as used herein, is a wireless communication path.

Figure 1B:
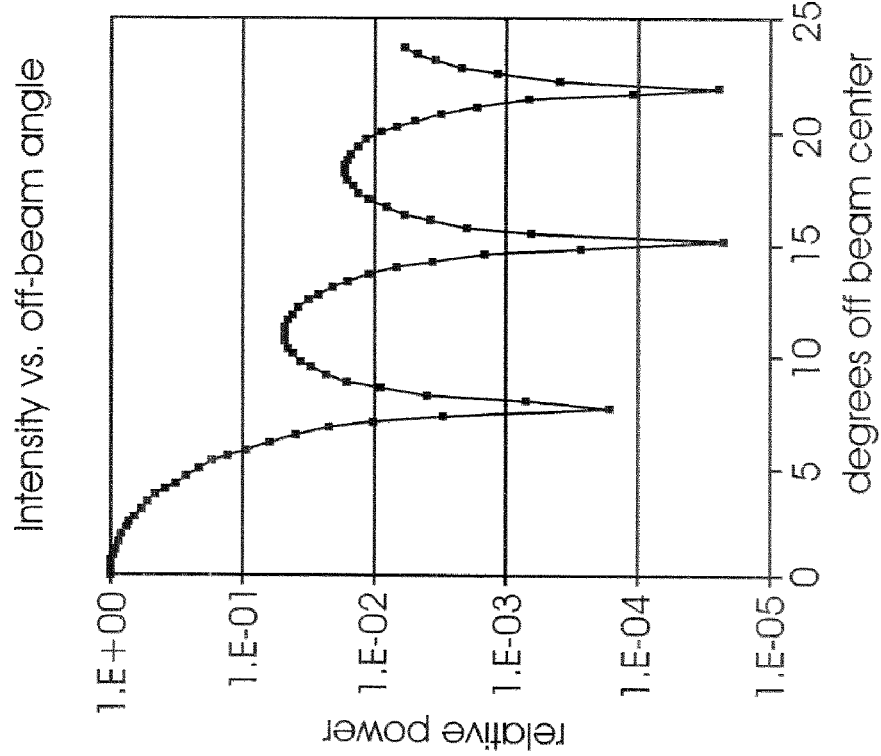
FIGS. 1a-1b show typical beam patterns generated by a 0.3 meter circular antenna at 15 GHz being pointed at communication nodes, in linear scale and log scale, respectively.
Figure 1A:
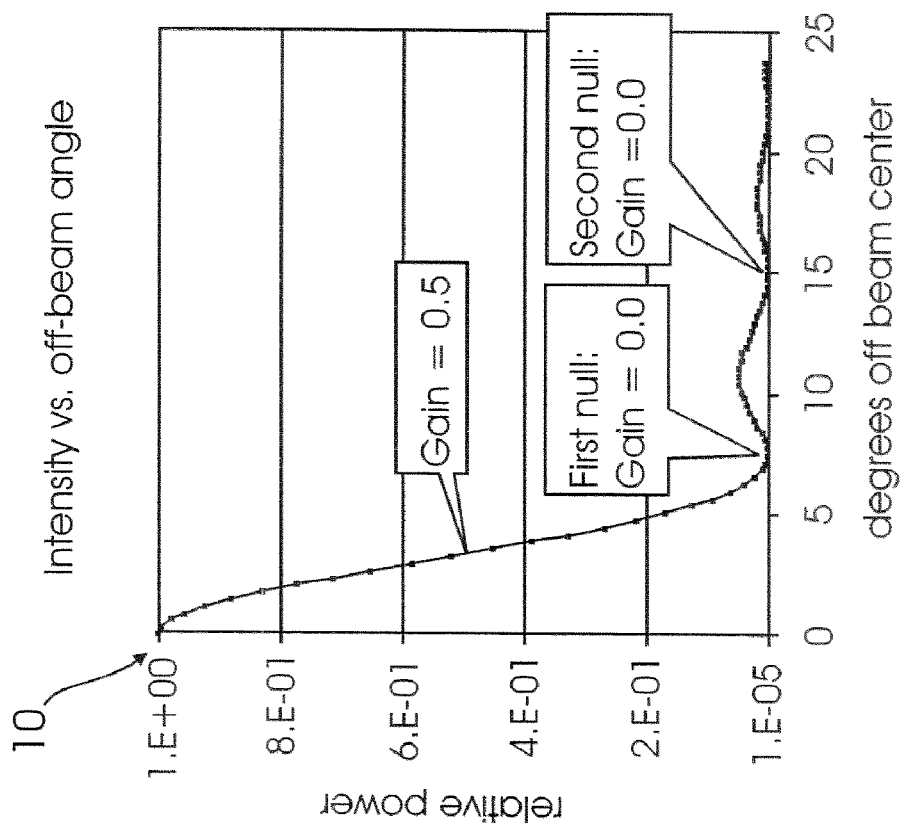

FIGS. 1a-1b show typical beam patterns generated by a 0.3 meter circular antenna at 15 GHz being pointed at communication nodes, in linear scale and log scale, respectively. As will be discussed below, knowing the locations of nulls in the beam patterns may be used to reduce interference in accordance with an embodiment of the disclosure. In the example shown in FIG. 1a, the gain is at its highest point 10 at the center of the beams which is on the axis of the antenna. For angles off the axis, the gain falls rapidly, and reaches zero at approximately 7.5° from center (the first null). The gain rises again, before falling to a second null, and so on, as the degrees from center increase. Relative to the gain at the center of the beam, the gain falls to 0.5 at slightly less than halfway from the center to the first null.

Figure 2:
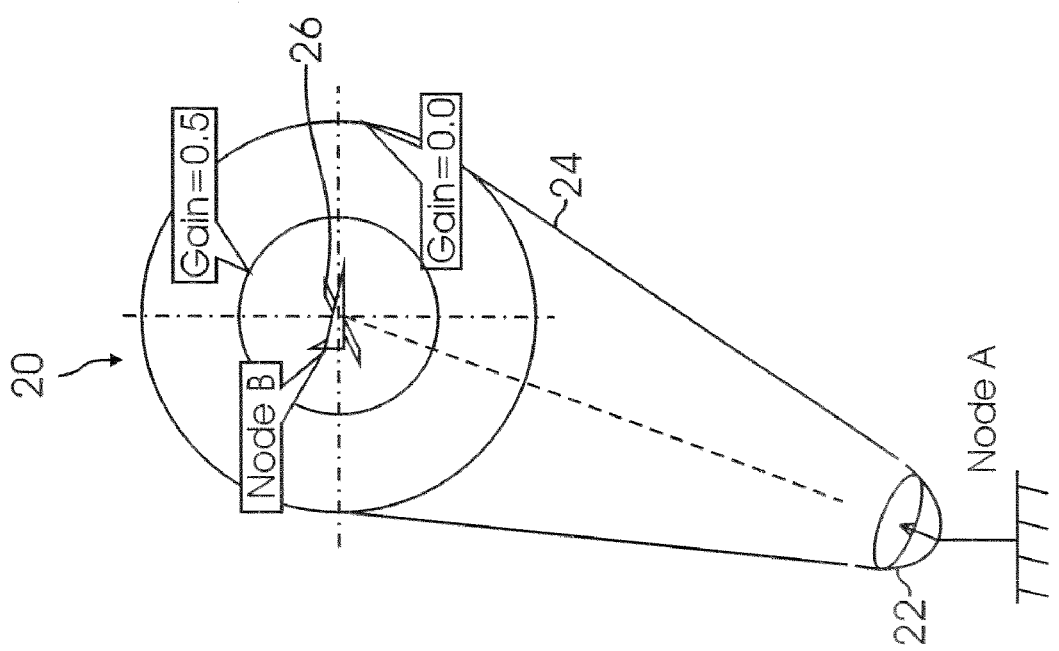
FIG. 2 shows an example of a mobile network.

FIG. 2 shows an example of a mobile network including at least one antenna 22, such as a steerable high-gain antenna, designated as node A. Although not shown in subsequent figures, it should be understood that antenna 22 or similar communication link creates the beam patterns referenced therein. In this example, antenna 22 is pointed toward a second or target node, designated node B, to enable communication between the nodes. In this example, node B is an aircraft 26 having an omni-directional antenna (not shown). An omni-directional antenna is an antenna system that receives power uniformly in all directions. The peak gain is achieved when the center of antenna beam 24 is directed at the antenna of aircraft 26 at node B. In this example, since aircraft 26 is alone in beam 24, no interference is experienced in mobile network 20.

Figure 3A:
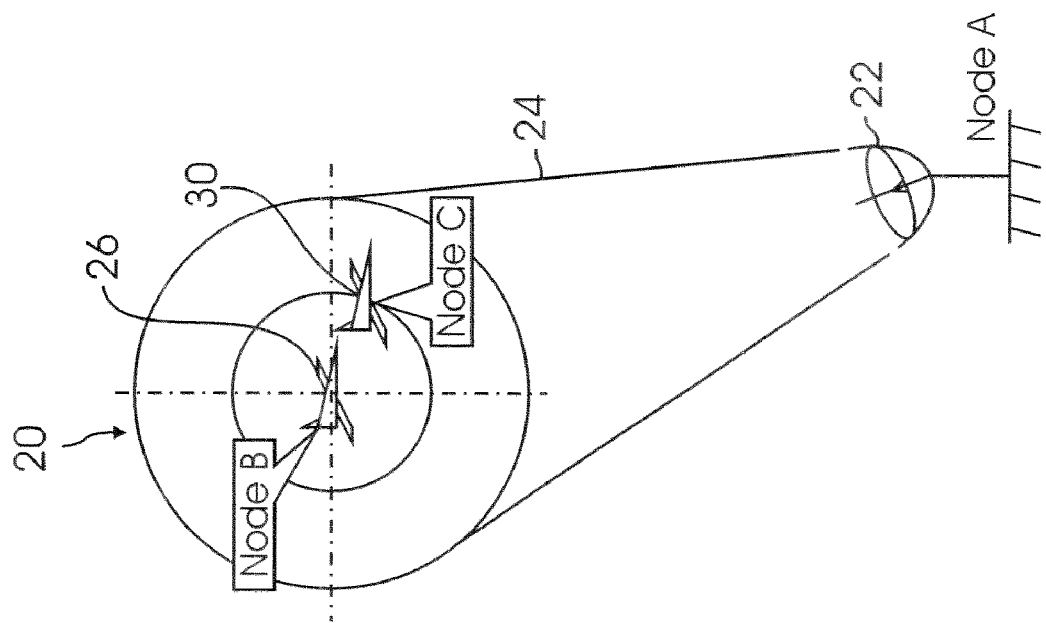
FIG. 3a shows an example of signals from a first node interfering with a second node in the mobile network.

FIG. 3a shows an example of mobile network 20 having a first target 26, such as an aircraft at node B, and a second target 30, such as another aircraft at node C. In this example, signals sent between antenna 22 at node A and target 26 at node B interfere with target 30 at node C. As shown, since node C is less than half a beam width from node B, the gain for accidental signals transmitted from node A to Node C is about 0.5. As a result, the signal from node A to node B may cause unacceptable interference to node C if node C attempts to receive any other signals.

Figure 3B:
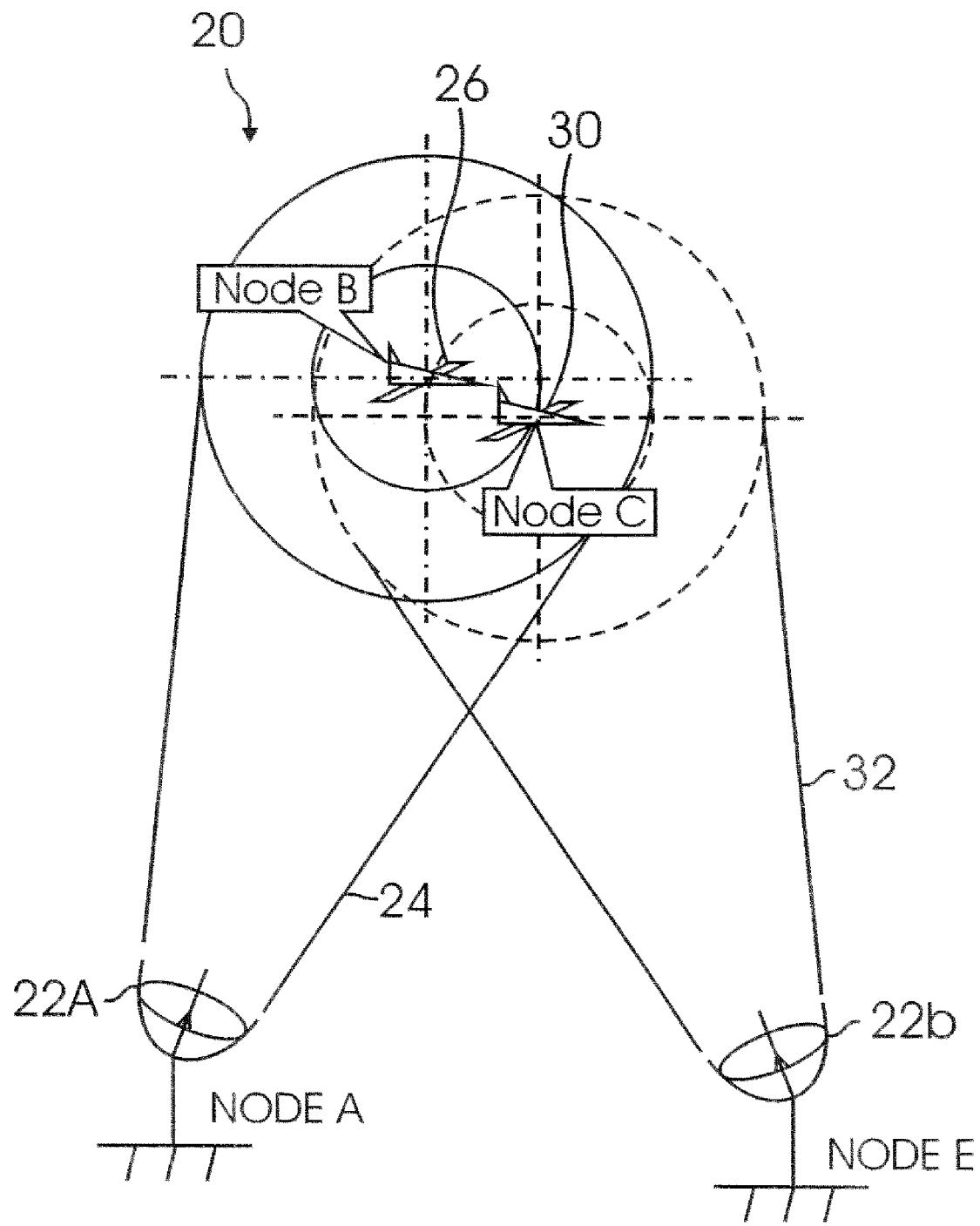
FIG. 3b shows an example of an additional antenna adding to the interference in the mobile network of FIG. 3a in accordance with an embodiment of the disclosure.

FIG. 3b shows an example of mobile network 20, having first target 26 at node B and second target 30 at node C. In this example, a first antenna 22a at node A is communicating with target 26 and a second antenna 22b at node E is communicating with target 30. Antenna 22a adds interference at node C and antenna 22b adds interference at node B. Antenna beam 32 from second antenna 22b overlaps antenna beam 24 from first antenna 22b. Neither node B nor node C can receive a clear signal because the signals intended for node B and node C mutually interfere. Therefore, the achievable data transfer rates from node A to node B and from node E to node C are reduced.

Figure 4:
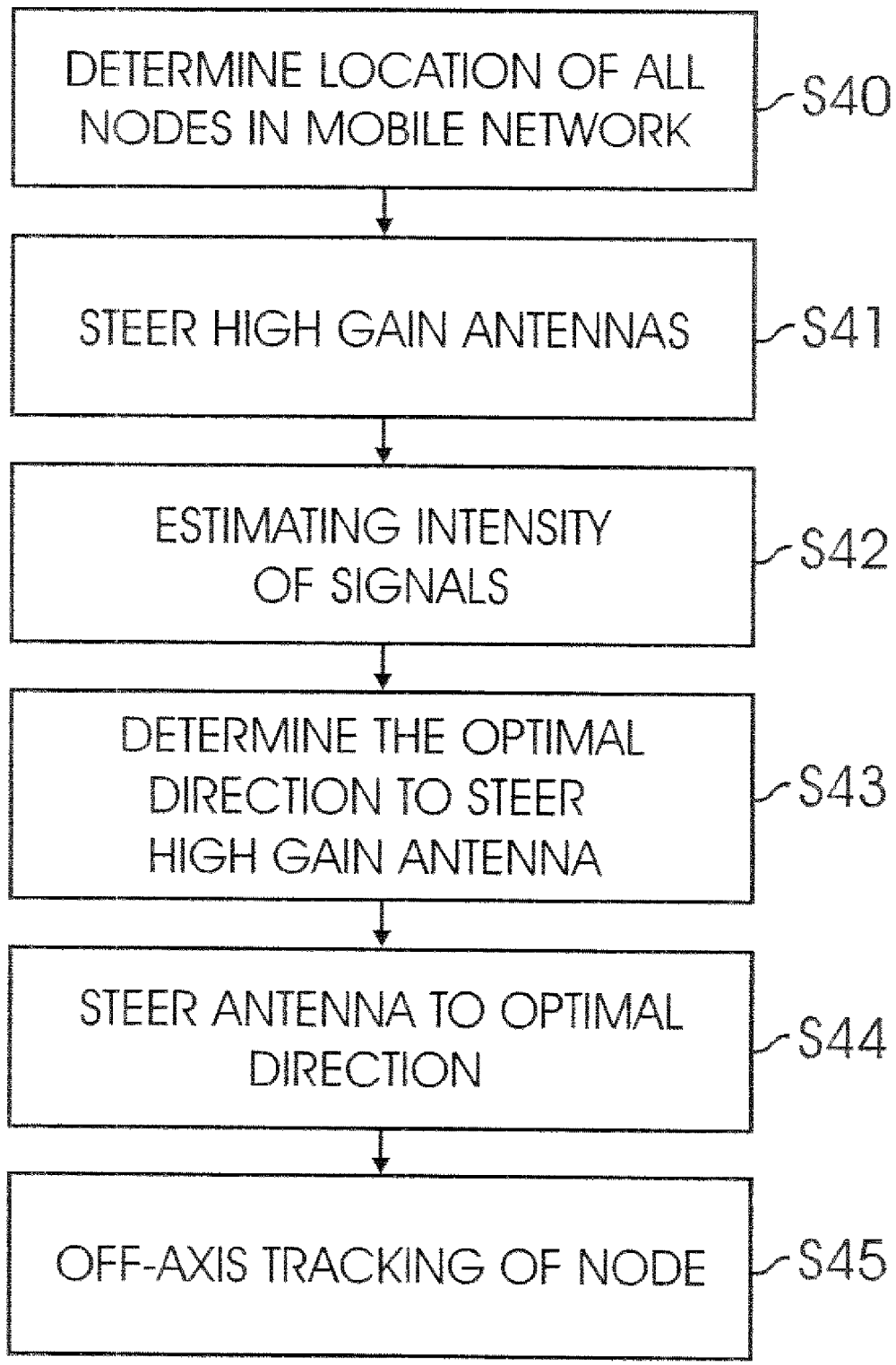
FIG. 4 is a flow chart illustrating tie steps of reducing interference amongst nodes in a mobile network in accordance with an embodiment of the disclosure.

FIG. 4 is a flow chart illustrating tie steps of reducing interference amongst nodes in a mobile network, such as mobile network 20 illustrated in FIGS. 3a and 3b.

In step S40, the locations of all targets or nodes in mobile network 20 are determined by continually determining the azimuth and elevation of each node, for example nodes B and C, relative to antenna 22, such as a steerable high gain antenna, at node A. The determination may be achieved by reports from radars, by navigation data embedded in messages firm each node, by conical scans of one or more antennas or by any method known in the art.

In step S41, once the locations of all the nodes are known, antennas 22 are pointed at different nodes to continually track the locations while the targets at each node operate.

In step S42, the intensity of signals from antenna 22 at node A arriving at each node (B, C, or D) is estimated to determine if the nodes are getting too close to each other, for example, within a beam width associated with the high gain antenna node. If any of the nodes are determined to be too close together, heuristics, described below, are applied to minimize the interference.

In step S43, the optimal direction (i.e. optimizing the primary-secondary ratio—described below) in which to steer the high-gain antenna is determined. The optimal direction is determined by computation and heuristics described below or by a human operator making decisions based on principles described below.

In step S44, antenna 22 is steered to the optimal direction. This may be achieved by mechanical pointing of a dish antenna, electronic steering of a phased array antenna or by other means known in the art. In step S45, off-axis tracking of a target node is performed with conical scanning of the high-grain antenna or off-axis monopulse tracking to keep a beam pointed at a target near the beams axis.

As mentioned above, the disclosure uses heuristics to make the search for the optimal direction for steering antenna 22 more efficient. A series of a heuristics are evaluated to determine if one of the heuristics provides the optimal direction of antennas 22, without having to perform exhaustive computations. An exemplary series of heuristics used to determine the optimal direction are now described:

When the primary-to-secondary ratio (PSR), described below meets or exceeds an adequate level selected by the user, antenna 22 continues to be pointed at the target node.

When heuristic a. is inadequate, choose the node, such as node C, which receives the highest interference from node A when the antenna at node A is pointed at node B. Point the beam at a location on a line from node C through node B, with the location being one half-beam width from node C. This puts the first null on node C and puts the center of the beam as close as possible to node B. (See FIG. 5*b*) while this approach yields an adequate PSR, and heuristic a. does not, this approach should continue to be used.

When heuristic b. is inadequate, choose the node, such as node D, which receives the highest interference from node A when the antenna at node A is pointed in the direction chosen by heuristic b. Compute the PSR for each pointing direction that is one half-beam width from node C and from node D. The two such directions put the first null on both node C and node D. (See FIG. 6*b*) Of the two such locations, select the location that provides the best PSR (the strongest signal). Continue with this approach if the PSK is adequate, and heuristics a. and b. are not.

When heuristic c. is inadequate, if the available high-gain antenna has an adjustable beam shape, start at the location selected by heuristic c. and search incrementally for better locations while increasing the beam width. That is, repeat the following steps until an optimum direction is found within the available beam constraints: (1) widen the beam incrementally, then (2) search locally for pointing locations that give better PSR. If the beam can be widened in both axes, the search may follow two paths as the beam is widened in each axis individually, or it may follow a single gradient descent search where the beam is gradually widened in either direction where the direction at each point is locally optimal.

When heuristic d. is inadequate if the available high-gain antenna has a non-circular beam and is rotatable about the beam axis, start at the location selected by heuristic d. and search until an optimum is found within the available beam constraints, repeating the following steps: (1) rotate the beam incrementally, then (2) search locally for pointing locations that give better PSR.

When all heuristics fail to achieve an adequate PSR, start at the location selected by heuristic c. or d. or e. if more appropriate, and conduct a local optimization about that location. If time and computing resources permit also conduct a broader search using a general search algorithm such as simulated annealing over a larger azimuth-elevation space.

Figure 5B:
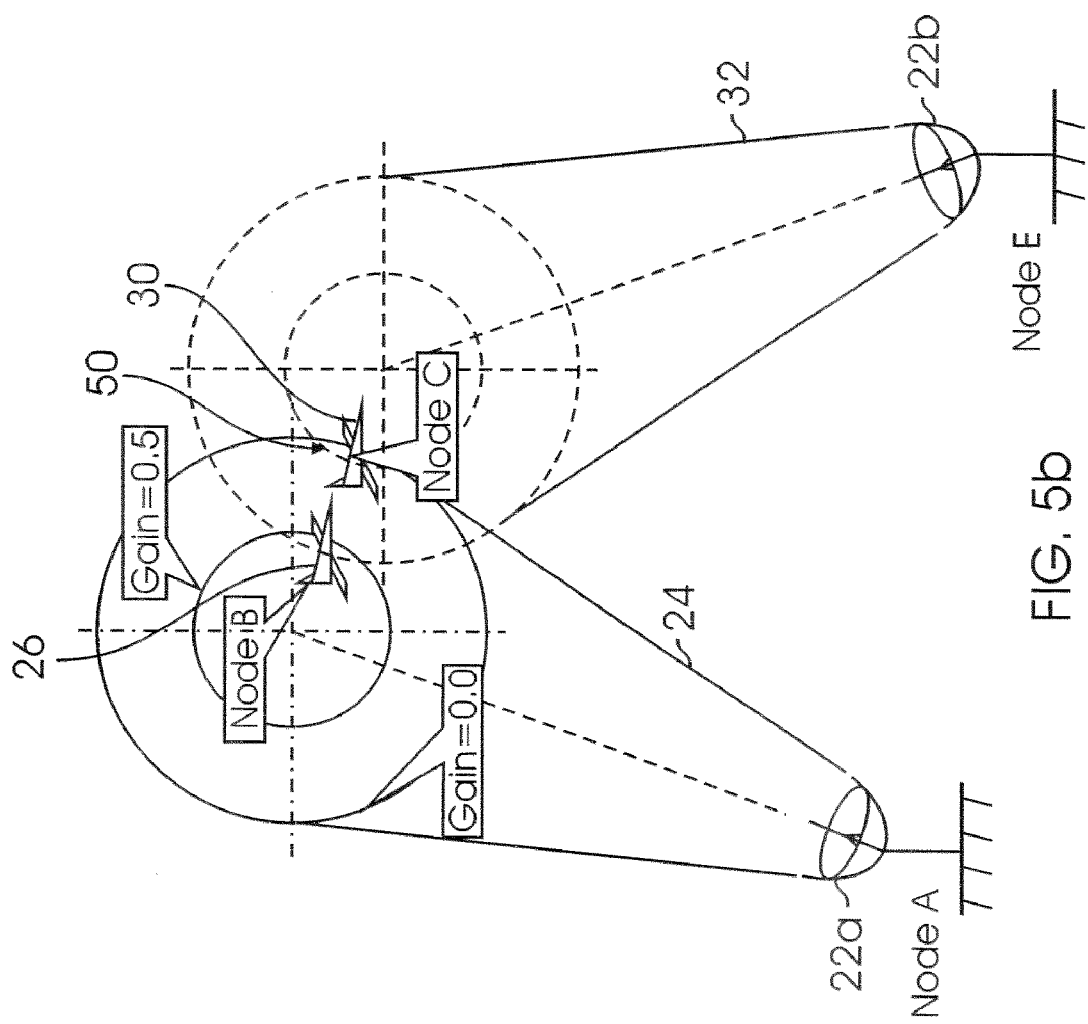
FIG. 5b shows an example of reducing interference in a mobile network by pointing first and second antenna beams off-center in accordance with an embodiment of the disclosure.
Figure 5A:
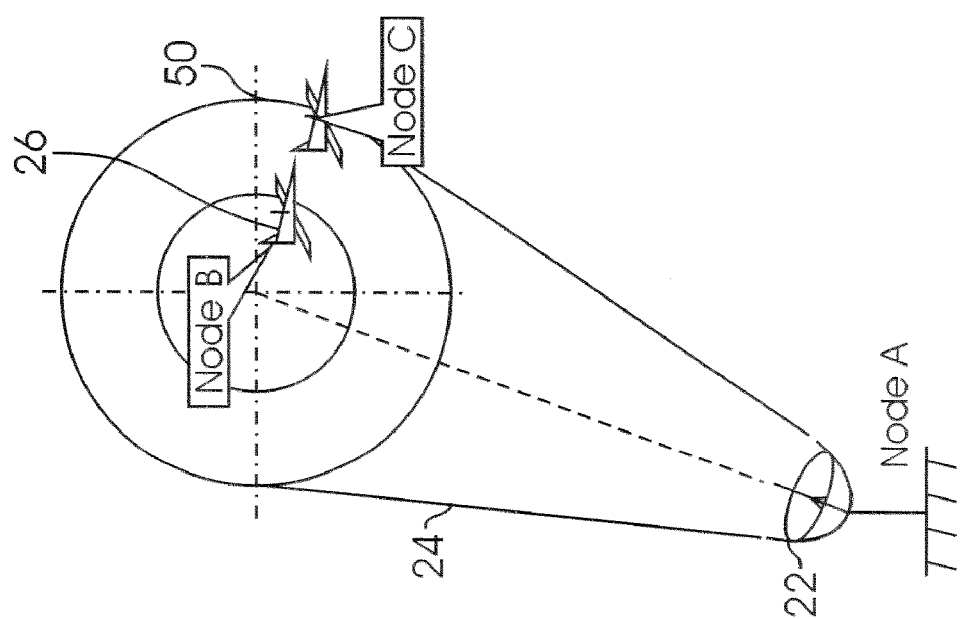
FIG. 5a shows an example of reducing interference in a mobile network by pointing the antenna off-center of the beam in accordance with an embodiment of the disclosure.

FIG. 5*a* shows an example of reducing interference in mobile network 20 by pointing antenna 22 off-center of beam 24, such that the optimal direction is not aligned with the intended target 26 at node B. Antenna 22 at node A may be pointed to minimize the signal reaching node C which causes interference. Instead of antenna 22 pointing directly at node B, the direction of antenna beam 24 is offset so that antenna beam 24 is not pointing directly at node B. Putting the first null 50 of antenna beam 24 on node C minimizes the signal from node A to node C and therefore minimizes interference at node C. Antenna 22 at node A may be pointed so node B is off-center of antenna beam 24, but node C is near first null 50 resulting in a better signal-to-interference ratio for node C.

FIG. 5*b* shows an example of reducing interference in mobile network 20 by pointing antenna beam 24 from first antenna 22*a* and antenna beam 32 from second antenna 22*b* off-center relative to their respective targets 26 and 30. As a result, target 26 is placed at first null 50. Antenna beam 32 from antenna 22*b* at node E, communicates with node C by pointing slightly off-center (and not directly) so that node B is at first null 50 of antenna beam 24 improving the signal-to-interference ratio for signals from node A to node B. Accordingly, nodes B and C can each receive data at full speed, as if the other was not present.

Figure 6B:
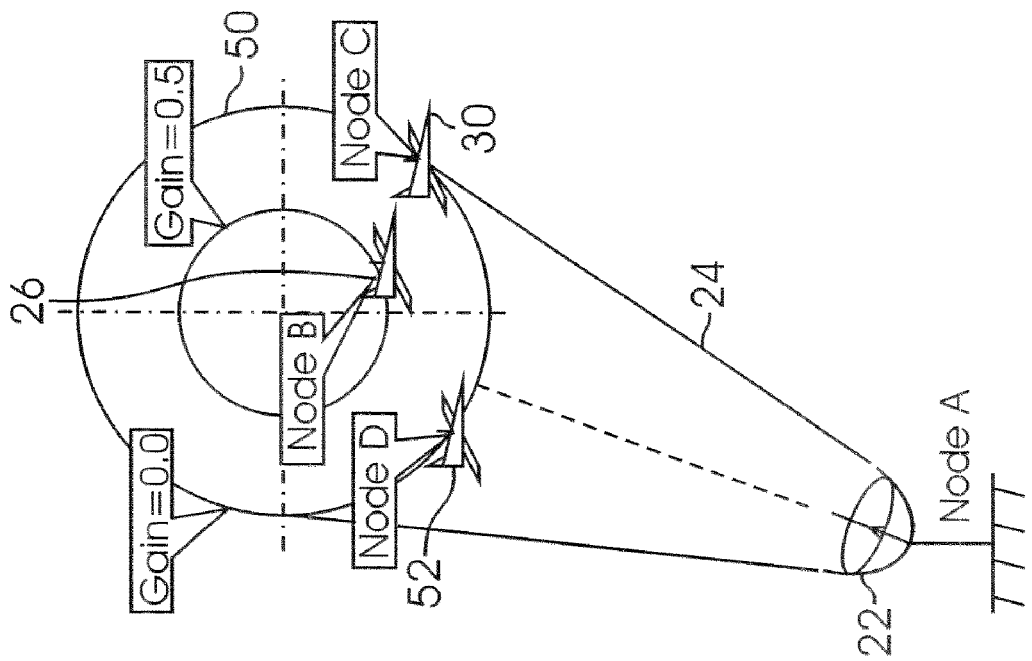
FIG. 6b shows the example of minimizing interference where three nodes are close together in azimuth and elevation in accordance with an embodiment of the disclosure.
Figure 6A:
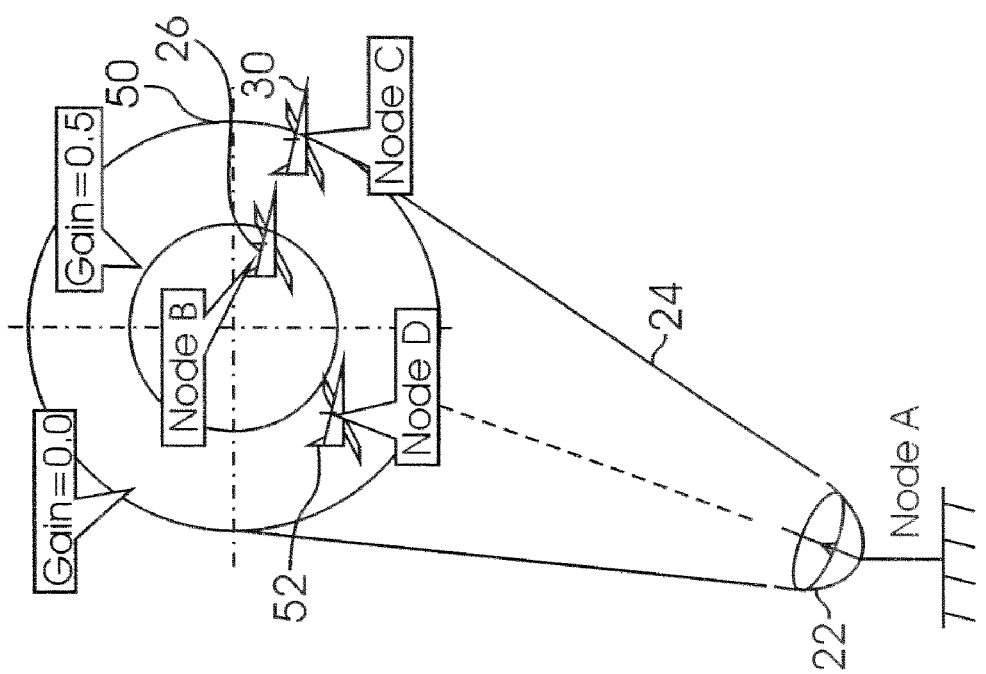
FIG. 6a shows an example of a mobile network having three nodes in close proximity to each other in azimuth and elevation in accordance with an embodiment of the disclosure.

FIG. 6*a* shows an example of mobile network 20 having three nodes in close proximity to each other in azimuth and elevation. In this example if the two-node solution described with reference to FIG. 5*b* is applied to the three node network, the result is interference at the third node 52. In this example, the signal from node A to node B does not interfere with node C, however it interferes with node D. With antenna 22 at node A pointed to that position, the location of node D gives it a gain of approximately 0.3. Although interference to node C is minimized, node D receives interference due to signals from node A to node B.

FIG. 6*b* shows the example oft minimizing interference in FIG. 6*a* where three nodes 24, 30 and 52 are in close proximity in azimuth and elevation To reduce interference at both nodes 52 and 30, the two nodes are placed at first null 50. Antenna 22 is positioned to put first null 50 on node C and node D. The location of node B gives it a gain of approximately 0.4. Although this is less than half the gain it would have at the center of beam 24, it is more than adequate for good reception, while interference to node C and node D is minimized.

Figures 7, 8:
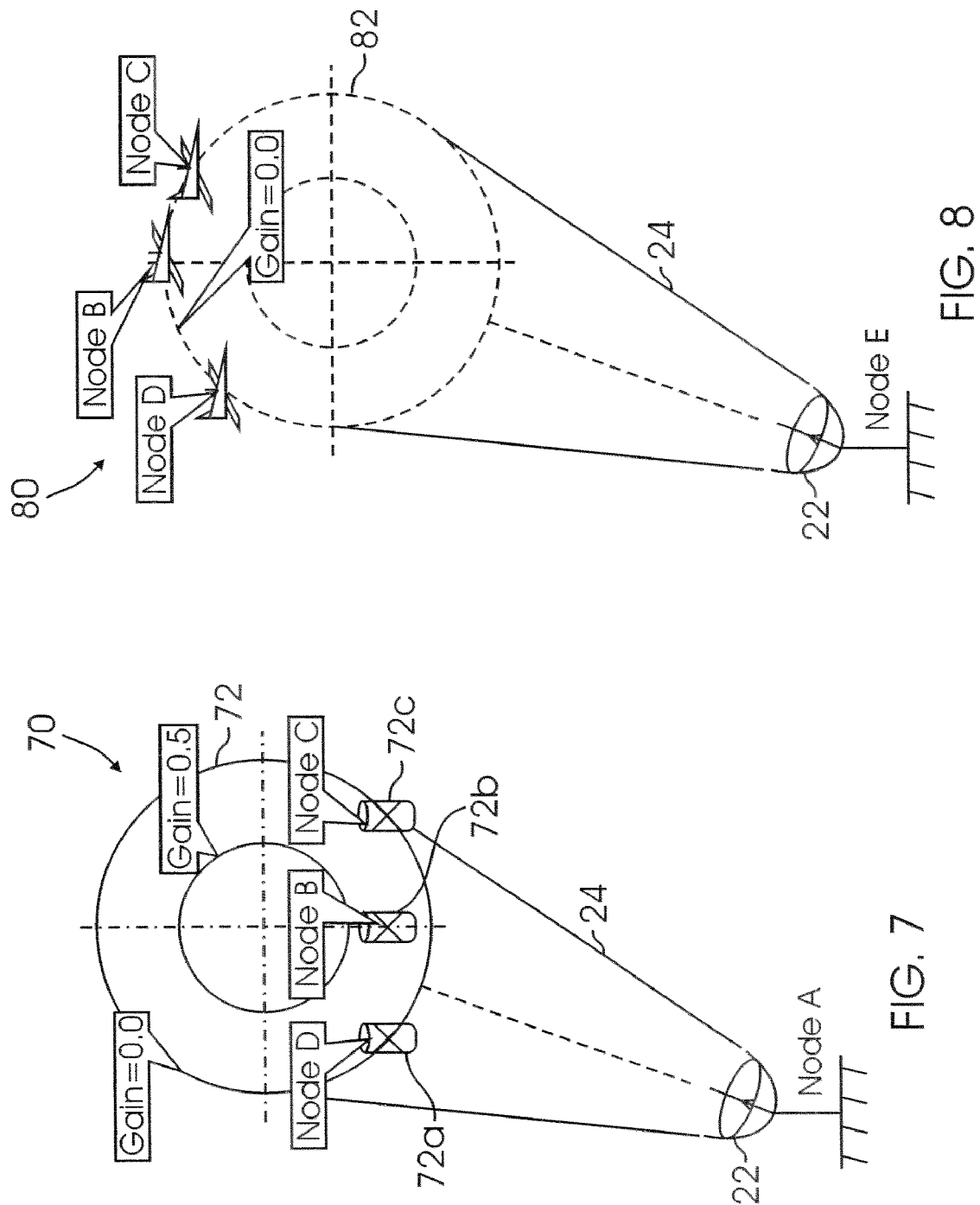
FIG. 7 shows an example of a typical satellite communications scenario with three GEO satellites positioned in a row.
FIG. 8 shows the situation of FIG. 7, but complicated by the need to communicate with all three nodes in accordance with an embodiment of the disclosure.

FIG. 7 shows an example of typical satellite communications (SATCOM) network 70 with three GEO satellites 72*a*, 72*b* and 72*c* positioned in a row. In SATCOM, antenna 22 at node A needs to communicate to GEO satellite 72*b* at node B, which is sandwiched in a line between adjacent GEO satellites 72*c* at node C and 72*a* at node D. Transmissions from node A to node B must not interfere with node C or node D, however, if antenna 22 is pointed at GEO satellite 72*b* at node B, antenna beam 24 is so wide it covers both adjacent GEO satellites 72*a* and 72*c*. Typically, to solve this problem a larger antenna with a narrower beam may be used. However, the disclosure computes the proper antenna position to put first null 72 on adjacent GEO satellite 72*c* at node C and 72*a* at node D, yet still gets reasonable gain to and from GEO satellite 72*b* with a smaller antenna and at a full data rate.

In other embodiments, mobile network 20 may be in communication with more than one target node. FIG. 8 shows the example described in FIG. 7, but complicated by the need to communicate with nodes B and C and by unfortunate locations of nodes B, C, and D. Given the particular locations of node B, node C, and node D in this example an appropriate antenna position for node A can easily be found, but an antenna position where the first null of node E covers nodes B and D while giving node C adequate gain cannot be found. Instead, all three nodes lie on an arc 80 that perfectly matches first null 82. Preventing node A to node B signals from interfering at node C and node D can be accomplished by positioning first null 82 as shown in FIG. 6*b*, but signals from node E to nodes C or D cannot prevent interference in the same way.

Figure 9:
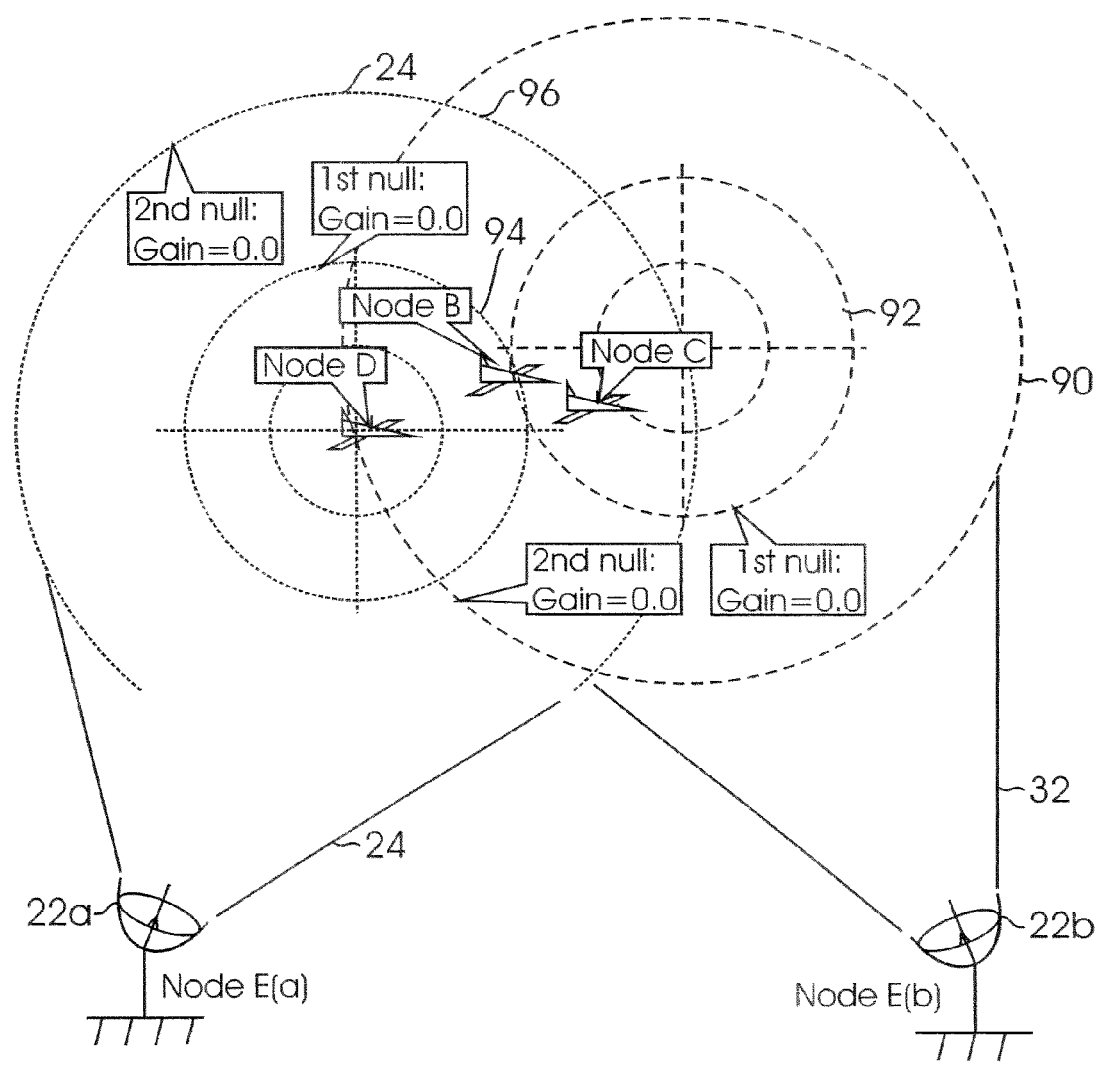
FIG. 9 shows an example of preventing interference from not only node A to node B signals, but also signals from node E to nodes C or D in accordance with an embodiment of the disclosure.

FIG. 9 shows an example of preventing interference from not only node A to node B signals but also signals from nodes E(a) and E(b) to nodes C or D. Antennas 22*a* and 22*b* at nodes E(a) and E(b), respectively are pointed so second null 90 covers one or more of the interfering nodes. In the antenna beam 32, centered closest to node C, first null 92 covers node B, but second null 90 lies close to node D. In this embodiment, the position of node C gives it a gain of about 0.4, while the gain for node D is about 0.02, so node D operates with a signal-to-interference ratio of about 20 (assuming similar ranges for node C and node D) which allows operation without degradation. Looking at antenna beam 94 centered near node D, the position of node D gives it a gain of about 0.9, node B is covered by first null 92, and node C is between first null 92 and second null 90 with a gain of about 0.05. As with node D, this gives node C a high enough signal-to-interference ratio to operate without signal degradation. Use of second null 90 minimizes mutual interference for signals to nodes C and D.

When more than three nodes are crowded together, the pointing direction may be found by continually choosing the optimal value of $\hat{r}_{ant}$, which is the unit vector in the direction that antenna 22 at node A points (this is the same information as azimuth and elevation). The optimal $\hat{r}_{ant}$ is the one that maximizes the value:

$$PRS = \min\left(\frac{G(\hat{r}_{ant}, \hat{r}_B)}{G(\hat{r}_{ant}, \hat{r}_i)}\right) \quad (1)$$

where

PSR is the primary-to-secondary ratio; $\hat{r}_B$ is the unit vector in the direction toward node B.

$G(\hat{r}_{ant}, \hat{r}_B)$ is antenna gain toward node B given pointing direction $\hat{r}_{ant}$;

min( ) is the minimum value of the expression in parentheses over all nodes, i, that are not nodes A or B;

$\hat{r}_i$ is the unit vector in the direction toward node i; and $G(\hat{r}_{ant}, \hat{r}_i)$ is antenna gain toward node i given pointing direction $\hat{r}_{ant}$.

Thus, the value of [signal gain toward node B/signal gain toward node i] for the node i that experiences the worst interference from node A is maximized.

In one embodiment only azimuth, elevation and antenna gain are used to optimize the pointing of the antenna. (Equation 1) In another embodiment, information about the range to each node and the signal's attenuation with distance is used. (Equation 2)

$$PSR = \min\left(\frac{G(\hat{r}_{ant}, \hat{r}_B)/r_B^2}{G(\hat{r}_{ant}, \hat{r}_i)/r_i^2}\right) \quad (2)$$

where $r_B$ is the range from node A to node B and $r_i$ is the range from node A to node i.

Both equations use antenna pointing to optimize the PSR for communication with a primary node in the presence of secondary nodes.

Figure 10:
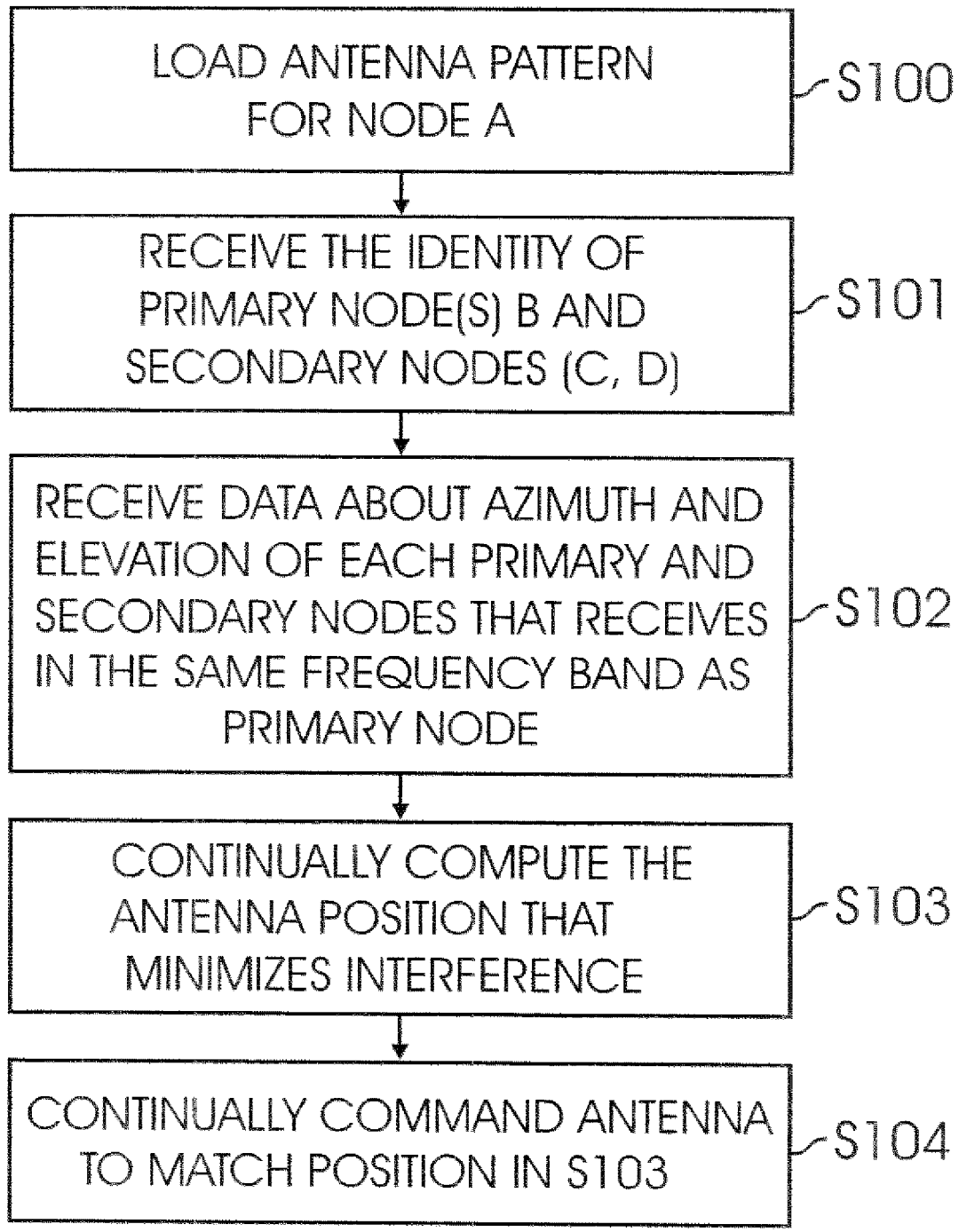
FIG. 10 is a flow chart illustrating the steps of selecting the correct direction to point each antenna in accordance with an embodiment of the disclosure.

FIG. 10 is a flow chart illustrating the steps of selecting the correct direction to point each antenna. In step S100, a computer is loaded with an antenna pattern for node A. Alternatively, it can be loaded with data from which to compute the pattern. In step S101, the computer receives the identity of a primary node or nodes B. The computer is responsible for communication from node A to each primary node B. In step S102, the computer continually receives data about the azimuth and elevation of each primary node and about each secondary node C or node D that receives in the same frequency band as a primary node B. Alternatively, the computer may receive data about the 3D location of each primary and secondary node, compare it with pre-loaded data about the 3D location of the antenna, and thereby compute the azimuth and elevation of each node.

In step S103, the computer continually computes (using equation (1) or equation (2)) the antenna position that minimizes interference from node A to secondary nodes C or D while maintaining good signal strength from node A at primary node B. In some embodiments, it uses heuristics (as described above) to make this computation more efficient. In step S104, the computer continually commands the antenna to point to the selected position, i.e. match the position in step S103.

Alternative embodiments for selecting the correct direction to point each antenna to reduce interference include the following elements:

1. Computing the antenna gain of each of the receiving nodes B, C, and D in the direction toward node A, based on each node's location orientation, and far-field antenna pattern, and modifying the gain $G(\hat{r}_{ant}, \hat{r}_B)$ or $G(\hat{r}_{ant}, \hat{r}_i)$ in equations 1 or 2 based on the computed gain of the receiving nodes.

2. Modifying the gain $G(\hat{r}_{ant}, \hat{r}_B)$ or $G(\hat{r}_{ant}, \hat{r}_i)$ in equations 1 or 2 based on computational models of multi-path and Fresnel zone impingement from objects and surfaces near the beam.

3. Sending commands to adjust the transmitter power of node A so as to maintain adequate SNR for communication to primary node B without emitting excess power that could interfere with secondary nodes C or D.

4. Adjusting the beam width or beam shape to optimize PSR (see FIG. 11) for phased array antennas or other antennas capable of varying their patterns.

5. Optimizing rotation of the antenna when using an antenna whose pattern is not circularly symmetric and whose rotation can be controlled.

6. Compensating for the lag time of a slow-responding antenna by estimating future positions of each node based on its trajectory and computing the antenna position to aim at after the antenna's lag time.

Figure 11:
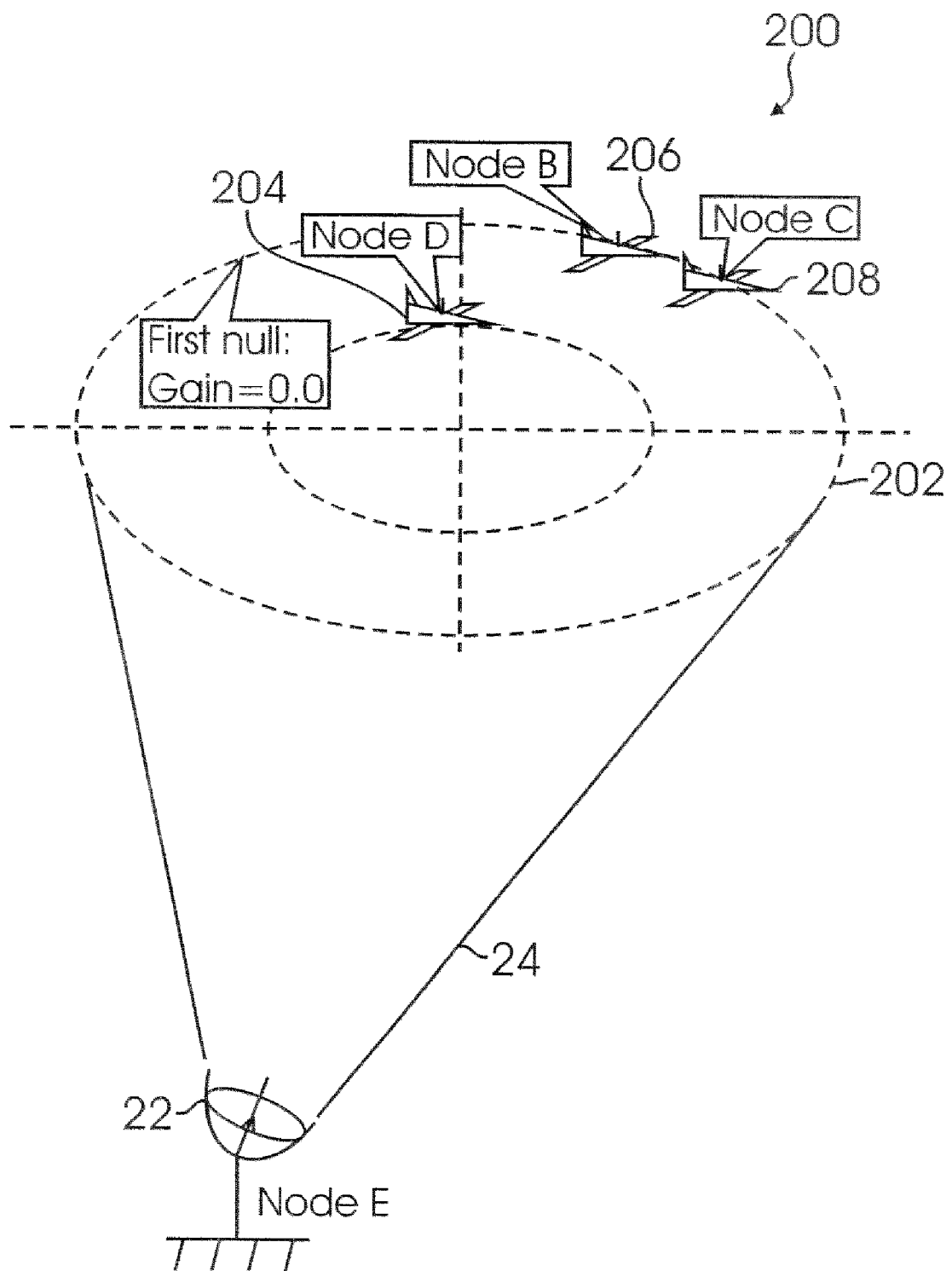
FIG. 11 shows an example of a mobile network widening the antenna beam to place the first null on two nodes in accordance with an embodiment of the disclosure.

FIG. 11 provides an example of mobile network 200 where antenna beam 24 from node E is widened to place first null 202 on target 206 at node B and target 208 at node C. This achieves a gain of about 0.4 for node D. A wider beam 24 can solve difficult beam-pointing problems such as finding a good solution for node D in the embodiment illustrated in FIG. 8. In FIG. 8, the curve of the circular beam is such that placing the first null on nodes B and C causes poor gain for node D. However, by widening the beam as shown in FIG. 11, the beam places first null 202 on node B and node C while achieving gain of about 0.4 for node D.

Figure 12B:
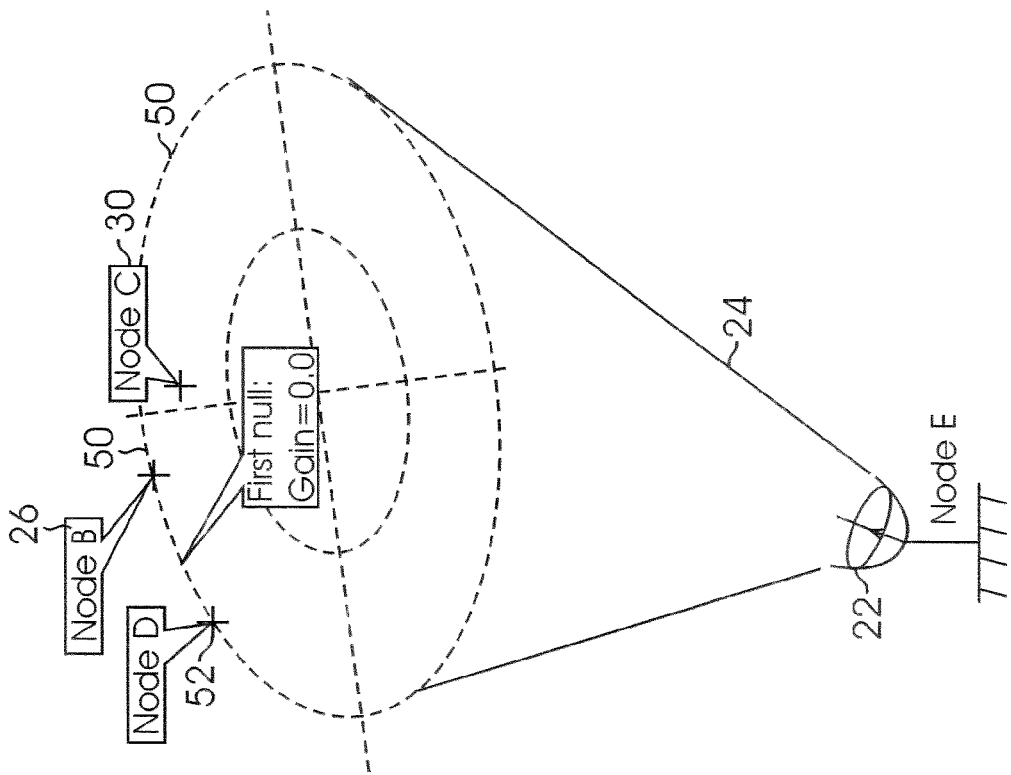
FIGS. 12a-12b show an example of a mobile network where the beam width and shape are non-circular in accordance with an embodiment of the disclosure.

Beam rotation can solve other beam-pointing problems such as finding a good solution for communicating from node E to node C, particularly when the beam shape of the antenna 22 at node E is fixed but not circular (See FIG. 12). This may occur with some non-circular dish antennas.

Figure 12A:
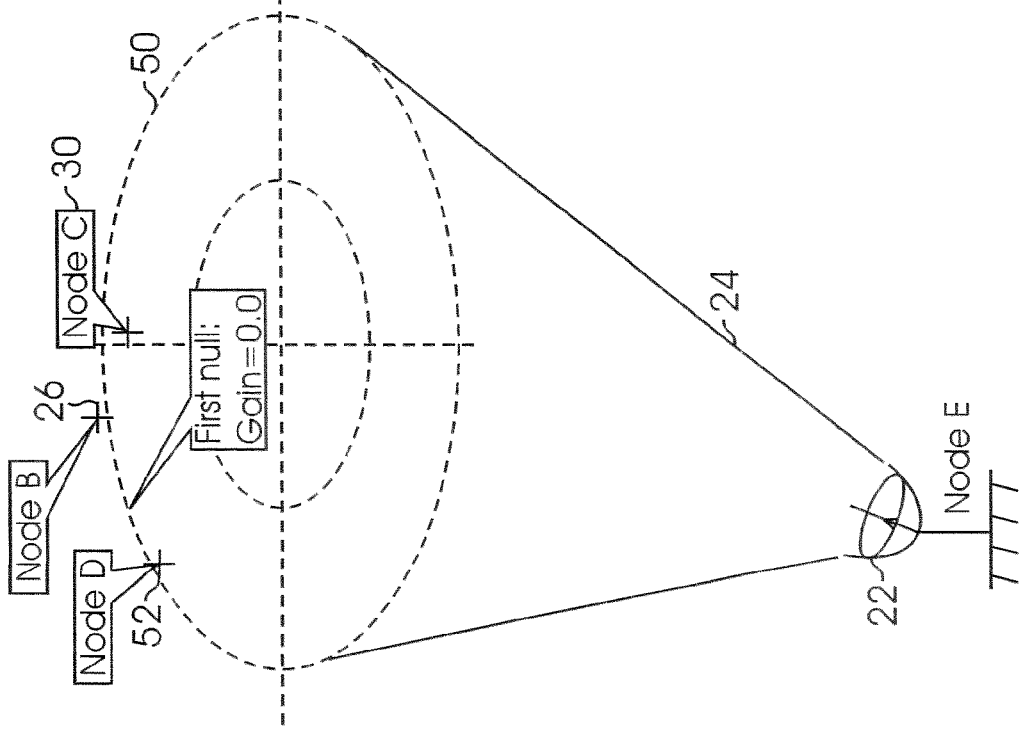

In FIG. 8, the curve of beam 94 is such that placing first null 82 on nodes B and D causes poor gain for node C. If the beam width and shape are non-circular but fixed as shown in FIG. 12a, then beam rotation can improve PSR. For example in FIG. 12a with the beam's cross sectional major axis oriented horizontally gain from the node-E-to-node-C signal is not sufficiently reduced at node B and node D—neither node B nor node D ends up directly on the first null 50. However, by rotating antenna beam 24 slightly to the left, as in shown in FIG. 12b, first null 50 is placed on node B and node D while gain for node C is increased.

As described above, heuristics are used to find the optimum antenna position relative to certain nodes. However, in networks where the target nodes transmit as well as receive, moment-to-moment tracking is often handled by automated systems in the receiver, the antenna, and the associated steering mechanism at node A or node E. Rather than repeat the search at each moment, it is desirable to let an automated tracking system keep the antenna pointed in roughly the right place while the target nodes move over short distances relative to each other.

Automated antenna tracking works by sequential lobing, conical scan, or monopulse tracking. Each of these methods enables the receiver to determine whether the strongest signal comes from left right, up, or down relative to the beam's axis, and then move the antenna to center the signal. For example, a monopulse tracker uses four antenna receiver feeds arranged as shown about the focal point of the antenna:

Electronic combiners generate three channels from the signal power arriving at each of these feeds:

azimuth delta=$(\alpha+\gamma)-(\beta+\delta)$
elevation delta=$(\alpha+\beta)-(\gamma+\delta)$
sum=$\alpha+\beta+\gamma+\delta$ where $\alpha, \beta, \gamma,$ and $\delta$ are the power received at each feed. The delta channels provide angular errors in azimuth and elevation to correct the antenna pointing, thereby keeping node B centered in the beam (assuming node B is transmitting). The sum channel is used to monitor received signal strength. The coefficient for each feed is hardwired with a value of unity, as shown in these equations.

When the intended antenna direction is not centered on node B, the automated tracking system fails. However, the disclosure provides a more flexible form of sequential lobing, conical scan, or monopulse tracking. In the disclosure, the desired coefficients of the four (or more) inputs are set by the computer when it completes a search. The desired relative strengths correspond to whatever location node B should have in the beam pattern. For example, the intended location for node B in FIG. 13a would be tracked according to the values shown in FIG. 13b. The "Gain" column shows the antenna gain, relative to beam center, for each of the four coning spots. The "Relative" column shows their strengths relative to the strongest (spot 1 in this case). The "Coefficient" column contains reciprocals of the "Relative" column: the coefficients amplify each feed's power to make the four signals equal when the antenna is pointed at the right location. Note that the "Gain" values are computed for the antenna pattern of node A at the frequency used for signals from node B to node A (which the autotracker uses), but the desired location of node B to optimize PSR is based on the antenna pattern of node A at the frequency used for signals from node A to node B.

Figures 13A, 13B:
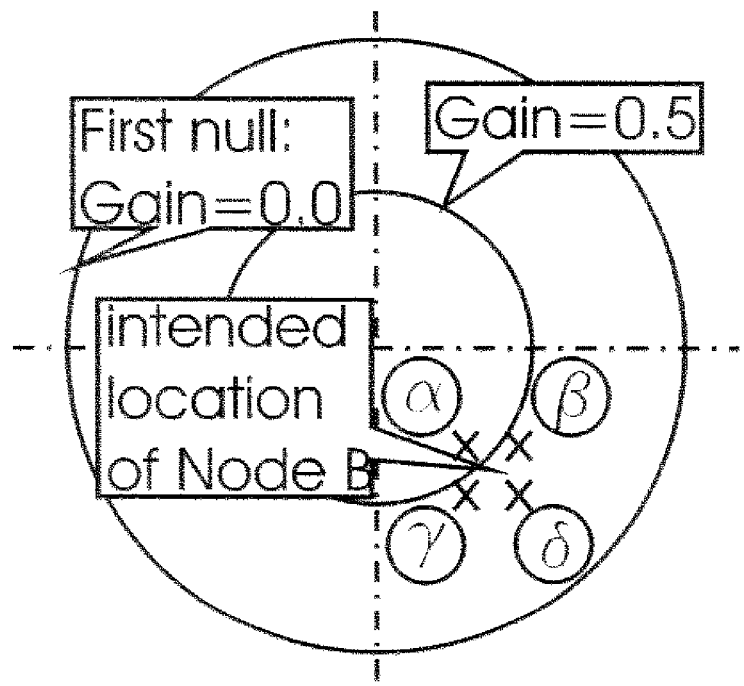
FIGS. 13a-13b show an example of an off-axis locations with four measurement spots in accordance with an embodiment of the disclosure.

FIG. 13b shows desired relative signal strengths and corresponding coefficients for each spot. For off-axis pointing, the autotracker is set to maintain unequal signal strength at the measurement locations $\alpha, \beta, \gamma,$ and $\delta$ shown by x's. The computer computes these four coefficients when it selects the desired off-axis location shows in FIG. 13a. The computer then loads these values into the autotracker. The autotracker uses those values until further notice to keep node B at the desired position. In the example shown the tracking equations would be:

azimuth delta=$(1.0\alpha+1.339\gamma)-(1.339\beta+1.934\delta)$
elevation delta=$(1.0\alpha+1.339\beta)-(1.339\gamma+1.934\delta)$
sum=$1.0\alpha+1.339\beta+1.339\gamma+1.934\delta$ The computer updates the coefficients when the nodes change their relative locations to ensure optimal direction pointing.

The descriptions above apply primarily to a computer implementation. However, human antenna operators may continue to be used in some situation is e.g. military Special Forces or civilian telemetry at unimproved range facilities. For human operators the disclosure is embodied as a visual display of the view along the axis of node A's high-gain antenna. Overlaid on this view are rings or ellipses indicating the first and second nulls as shown in FIG. 9. The primary node, B, is indicated by one type of visual mark and the secondary nodes (C, D, etc.) are indicated by one or more different marks. (This assumes visual enhancement is needed because the nodes are not directly visible or visibly distinguishable in the display.) The operator inputs steering commands (e.g. via a joystick) to point the antenna at primary node B, to align secondary nodes C or D with nulls in the antenna pattern, or to rotate the antenna about its axis (if that function is available). In an enhanced embodiment, the display is supplemented by a computer that continuously outputs a visual, audio, or tactile indicator of PSR to help the operator optimize PSR.

While the disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A method for reducing interference in a mobile network, comprising:

determining locations of a plurality of nodes in the mobile network;

steering at least one antenna at a first node in the plurality of nodes in the mobile network;

estimating intensity of signals from the at least one antenna at each of the plurality of nodes;

determining a direction to steer the at least one antenna to reduce interference in which a second node in the plurality of nodes is located at a null in the signals; and steering the at least one antenna in the direction;

wherein the step of determining the direction further comprises:

computing a first primary-to-secondary ratio when the at least one antenna is pointed at a first node in the plurality of nodes with a highest interference level to form a first direction;

responsive to the first primary-to-secondary ratio meeting a specified level, determining that the optimal direction is the first direction;

responsive to the first primary-to-secondary ratio not meeting the specified level, computing a second primary-to-secondary ratio when the at least one antenna is pointed such that a second node is in the null in the signals to form a second direction, wherein the second node received a most interference when the at least one antenna was pointed in the first direction;

responsive to the second primary-to-secondary ratio meeting the specified level, determining that the optimal direction is the second direction;

responsive to the second primary-to-secondary ratio not meeting the specified level, computing a third primary-to-secondary ratio when the at least one antenna is pointed at the second direction and a beam for the signals is incrementally widened to form a third direction;

responsive to the third primary-to-secondary ratio meeting the specified level, determining that the optimal direction is the third direction.

2. The method of claim 1, wherein a series of heuristics are used to determine the direction to minimize the interference when the plurality of nodes are too close to each other.

3. The method of claim 2, wherein each heuristic in the series of heuristics employs a primary-secondary ratio as part of applying the heuristic.

4. The method of claim 3, wherein a parameter in optimizing the primary-secondary ratio is varying antenna beam width.

5. The method of claim 3, wherein a parameter in optimizing the primary-secondary ratio is varying antenna beam's rotation angle about beam axis.

6. The method of claim 1, wherein the locations are determined by reports from radars, by navigation data embedded in messages from each node, or by conical scans.

7. The method of claim 1, wherein the step of steering the at least one antenna in the direction further comprises:
mechanically pointing the at least one antenna in the direction.

8. The method of claim 7, wherein azimuth, elevation and antenna gain are used to determine the direction to point the antenna.

9. The method of claim 7, wherein the range to each node and the signal's attenuation with distance are used to determine the direction to point the at least one antenna.

10. The method of claim 1, wherein an automated tracking system keeps the at least one antenna pointed in a correct location when the plurality of nodes are moving.

11. The method of claim 1, wherein the at least one antenna is pointed off-center relative to the first node in the plurality of nodes.

12. The method of claim 10, wherein the automated tracking system measures signal power in a plurality of directions.

13. The method of claim 12, wherein coefficients for each signal power measurement location are computed; and wherein the coefficients correspond to relative signal power at the direction; and wherein the coefficients are used by the autotracker to steer the antenna.

14. The method of claim 1, wherein the null is a first null, the signals have at least two nulls separated by an area where the signals may be received, and the first null and a second null are areas of zero gain in the signals.

15. The method of claim 1, wherein the second node being located at the null in the signals comprises the second node receiving less of the signals than the first node.

16. The method of claim 1, wherein the null is a first null, and a third node in the plurality of nodes is located at a second null in the signals, wherein the second null is separated from the first null by at least a portion of the signals.

* * * * *